(No Model.)

J. H. McCORMICK.
MACHINE FOR DELINTING COTTON SEED.

No. 519,613. Patented May 8, 1894.

Witnesses
Percy C. Bowen
John C. Wilson

Inventor
James H. McCormick
By Whitman & Wilkinson,
Attorneys

THE NATIONAL LITHOGRAPHING COMPANY,
WASHINGTON, D. C.

UNITED STATES PATENT OFFICE.

JAMES HUGHES McCORMICK, OF NEW ORLEANS, LOUISIANA.

MACHINE FOR DELINTING COTTON-SEED.

SPECIFICATION forming part of Letters Patent No. 519,613, dated May 8, 1894.

Application filed August 29, 1893. Serial No. 484,290. (No model.)

*To all whom it may concern:*

Be it known that I, JAMES HUGHES MC-CORMICK, a citizen of the United States, residing at New Orleans, in the parish of Orleans and State of Louisiana, have invented certain new and useful Improvements in Machines for Delinting Cotton-Seed; and I do hereby declare the following to be a full, clear, and exact description of the invention, such as will enable others skilled in the art to which it appertains to make and use the same.

My invention relates to machines for delinting cotton-seed, and it consists of certain novel features hereinafter described and claimed.

Reference is had to the accompanying drawings, wherein the same parts are indicated by the same letters throughout the several views.

Figure 1:
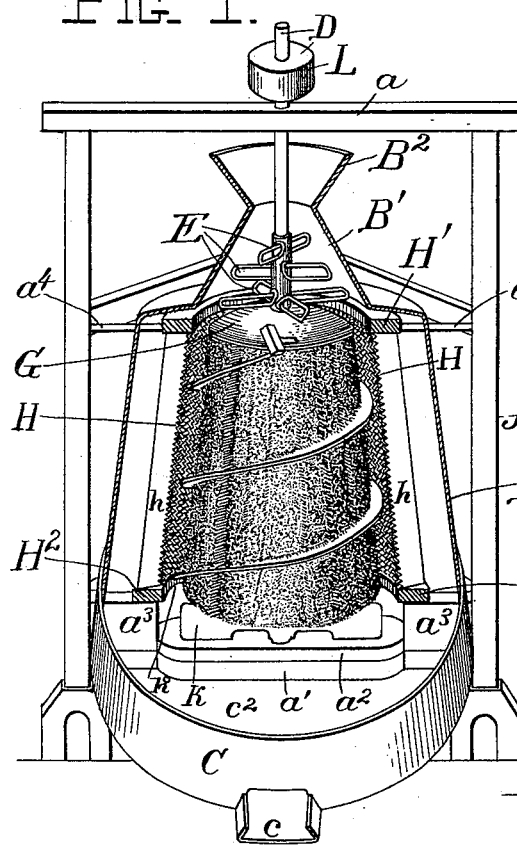
Figure 2:
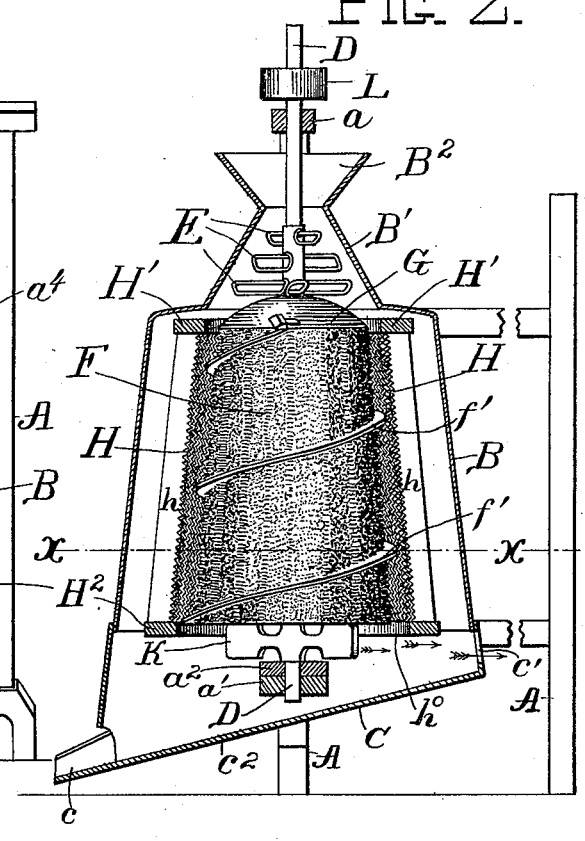
Figure 3:
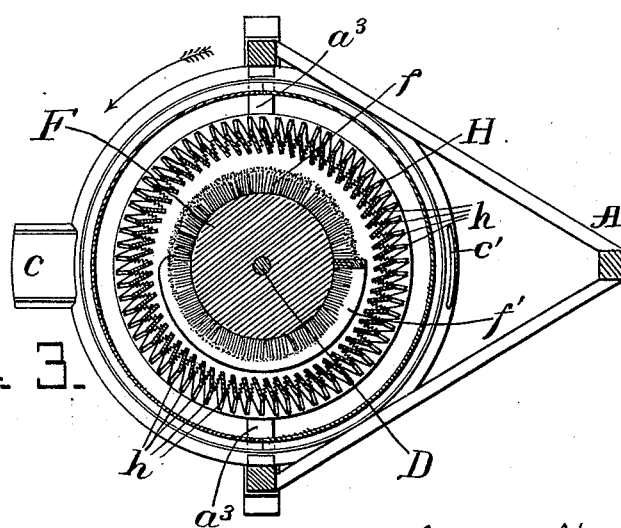

Figure 1 represents a vertical section through the casing and the delinting saws, the machine being shown in perspective. Fig. 2 represents a vertical section through the casing and saws in a plane at right angles to the plane of the section of Fig. 1; and Fig. 3 represents a section along the line $x\ x$ of Fig. 2, and looking down.

A represents the framework, in which the outer casing B is mounted. This casing is provided at its upper end with a conical chamber B', and a funnel mouth $B^2$; and tapering downward in the form of a frustum of a cone, it is connected to the bottom chamber C which is provided with a chute $c$ for the cotton-seed, and an aperture $c'$ for the escape of the lint. This chamber C is open upward as shown in Fig. 2, and provided with a sloping bottom $c^2$.

The shaft D is journaled in the upper cross piece $a$ and the lower cross pieces $a'\ a^2$ of the frame A, and carries the stirring or separating arms E, the sloping plate or disk G, the doffer or delinting brush F, and the fan K. The stirring arms E are set at an incline so as to pass into the seed freely, at the same time turning them over and keeping them well stirred up.

The cup-shaped disk G is attached to the upper end of the conical brush and serves as a scattering or distributing plate by which the seed are thrown to all sides of the brush.

The brush F is covered with projecting wires $f$, and carries on its periphery a spiral strip or conveyer $f'$ made of leather, rubber, or other suitable material, for the purpose of wedging or conveying the seed downward. Inclosing the conical brush and conveyer strip, I provide a saw casing H, which consists of a plurality of saws $h$, arranged at a less distance apart than the smallest diameter of a cotton seed and secured at their ends in the rings H' and $H^2$. These saws are set at an angle to the radii of the brush, as shown in Fig. 3. The distance between the points of the saws and the wires on the brush, is somewhat greater than the diameter of a cotton-seed. There is an open space between the saw casing H and the outer casing B, which space opens downward into the chamber C as shown in Fig. 2.

The rings H' and $H^2$ holding the ends of the saws are secured in the frame A by cross-pieces $a^3$ and $a^4$ as shown in Fig. 1. The bottom ring $H^2$ is open so as to allow the seed to pass freely downward, between the fan K and the sides of the chamber C.

The shaft D and the various parts mounted thereon are revolved in the direction of the arrow shown in Fig. 3, by means of the pulley L, or by any other convenient gearing.

The operation of the device is as follows:— While the shaft D is revolving, the cotton-seed to be cleaned is put into the hopper $B^2$—any well-known way of feeding the cotton-seed may be adopted—and falling into the chamber B' it is stirred up by the arms E, and is distributed around the sides of the said chamber B'; the cotton-seed after passing through this chamber B' falls on the distributing-plate G and falls over the edges of this plate, and between it and the ring H', into the space between the conical brush and the saw casing. The rapidly revolving brush rolls the seed over the saw teeth, which tear off the lint, and the latter passes through the open spaces between the saws into the space between the saw casing and the outer casing, and finds its way down into the bottom chamber C, where the vortical motion of the air, caused by the fan K, throws the light particles of lint outward, and they escape through the lint opening $c'$. At the same time the cotton seed being delinted is forced down by the spiral conveyer $f'$ until it finally drops into the bottom chamber C; but the cotton-seeds are sufficiently heavy not to be thrown outward by the fan, and fall on the inclined floor $c^2$ of the bottom chamber C, and find their exit through the spout $c$. The saws $h$ are set at an incline as shown in Fig. 3, so that the teeth may catch more readily on the lint as the seed is being rolled along, and also so that the lint may be thrown more directly outward through the open spaces between the saws.

Should it be desired, an air blast might be used in the direction of the arrows shown in Fig. 2, instead of the fan K.

It will be obvious that many modifications of the herein-described device might be made which could be used without departing from the spirit of my invention.

Having thus described my invention, what I claim, and desire to secure by Letters Patent of the United States, is—

1. In an apparatus for delinting cotton seed, the combination with a rotary brush, of a spiral strip secured thereon and projecting therefrom and an inclosing case consisting of a plurality of saws set at short distance from each other with open spaces between the said saws, the teeth of the said saws projecting inwardly and being in close proximity to said brush, substantially as and for the purposes described.

2. In an apparatus for delinting cotton seed, the combination with a rotary brush, of a spiral strip secured thereon and projecting therefrom and an inclosing case consisting of a plurality of saws set at an angle to the radii of said brush and at a short distance from each other, with open spaces between the said saws, the teeth of the said saws projecting inwardly toward said brush, substantially as described.

3. In an apparatus for delinting cotton seed, the combination with a conical brush, of an inclosing case consisting of a plurality of saws set at short distance from each other with open spaces between the said saws, the teeth of the said saws projecting inwardly and being in close proximity to said brush, substantially as and for the purposes described.

4. In an apparatus for delinting cotton seed, the combination with a conical brush, of an inclosing case consisting of a plurality of saws set at an angle to the radii of said brush and at a short distance from each other, with open spaces between the said saws, the teeth of the said saws projecting inwardly toward said brush, substantially as described.

5. In an apparatus for delinting cotton seed, the combination with the revolving shaft, and stirrers, distributing plate, and rotary brush mounted on said shaft, of a spiral strip secured thereon and projecting therefrom and an inclosing case consisting of a plurality of saws set at short distance from each other with open spaces between the said saws, the teeth of the said saws projecting inwardly and being in close proximity to said brush, substantially as and for the purposes described.

6. In an apparatus for delinting cotton seed, the combination with the revolving shaft and stirrers, distributing plate, and rotary brush mounted on said shaft, of a spiral strip secured thereon and projecting therefrom and an inclosing case consisting of a plurality of saws set at an angle to the radii of said brush and at a short distance from each other, with open spaces between the said saws, the teeth of the said saws projecting inwardly toward said brush, substantially as described.

7. In an apparatus for delinting cotton seed, the combination with a conical brush, and means for feeding the seed uniformly around said brush, of an inclosing case consisting of a plurality of saws set at short distance from each other with open spaces between the said saws, the teeth of the said saws projecting inwardly and being in close proximity to said brush, substantially as and for the purposes described.

8. In an apparatus for delinting cotton seed, the combination with a rotary brush, and means for feeding the seed uniformly around the said brush, of a spiral strip secured thereon, and projecting therefrom, and an inclosing case consisting of a plurality of saws set at a short distance from each other with open spaces between the said saws, the teeth of the said saws projecting inwardly and being in close proximity to said brush, substantially as described.

9. In an apparatus for delinting cotton seed, the combination with a rotary brush and means for feeding the seed uniformly around the brush, of a spiral strip secured thereon and projecting therefrom and an inclosing case consisting of a plurality of saws set at short distance from each other with open spaces between the said saws, the teeth of the said saws projecting inwardly and being in close proximity to said brush, and means for blowing the lint clear of the cleaned seed, substantially as and for the purposes described.

10. In an apparatus for delinting cotton seed, the combination with a rotary brush and means for feeding the seed uniformly around the brush, of a spiral strip secured thereon and projecting therefrom, and an inclosing case consisting of a plurality of saws set at an angle to the radii of said brush and at a short distance from each other, with open spaces between the said saws, the teeth of the said saws projecting inwardly toward said brush and means for blowing the lint clear of the cleaned seed, substantially as described.

11. In an apparatus for delinting cotton seed, the combination with a conical brush and means for feeding the seed uniformly around the said brush, of an inclosing case consisting of a plurality of saws set at short distance from each other with open spaces between the said saws, the teeth of the said saws projecting inwardly and being in close proximity to said brush, and means for blowing the lint clear of the cleaned seed, substantially as and for the purposes described.

In testimony whereof I affix my signature in presence of two witnesses.

JAMES HUGHES McCORMICK.

Witnesses:
HORACE VALLAS,
SEVERIN SPORL.